April 20, 1954  J. W. NICHOLS  2,676,050
DOOR HANDLE
Filed Jan. 28, 1949
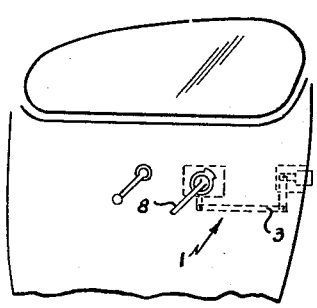
fig.-1
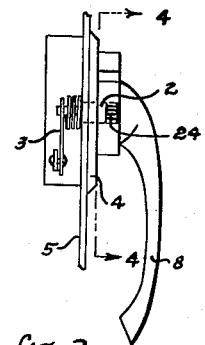
fig.-2
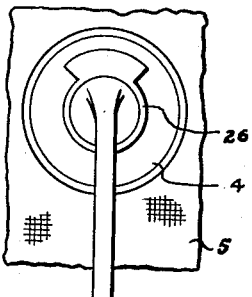
fig.-3
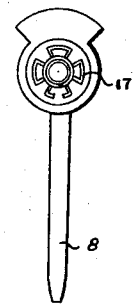
fig.-4
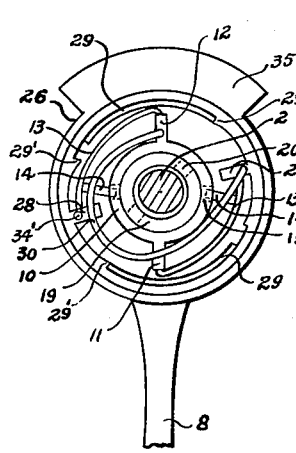
fig.-5
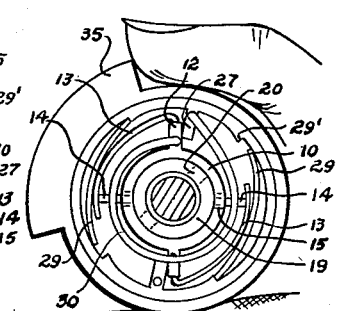
fig.-6
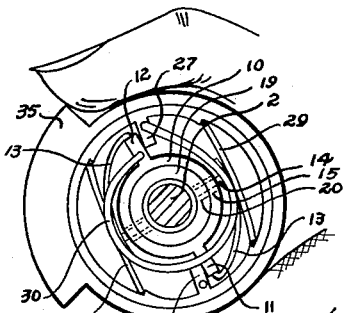
fig.-7
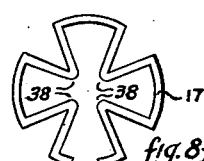
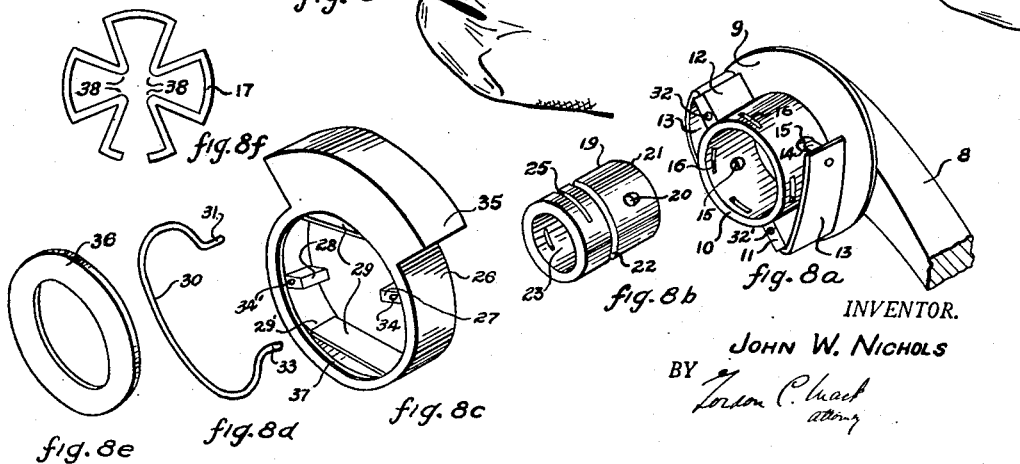
INVENTOR.
JOHN W. NICHOLS Patented Apr. 20, 1954

2,676,050

UNITED STATES PATENT OFFICE 2,676,050

DOOR HANDLE

John W. Nichols, Akron, Ohio

Application January 28, 1949, Serial No. 73,413

21 Claims. (Cl. 292—348)

This invention relates to handle mechanism such as a safety door handle which is designed to prevent a person from inadvertently opening a door located at a hazardous position. More particularly, this handle is intended for use on the doors of vehicles such as automobiles, trains, aircraft and the like but it is also applicable at certain places in industrial plants, etc. This invention is illustrated and is herein described as it is applied to an automobile door.

The conventional handles used on the interior panels of automobile doors are designed so that they may be easily and quickly operated. This is, however, a serious disadvantage in the respect that a person riding therein could accidently bump against one and thereby cause it to open. A still more serious consequence is the fact that small children have a tendency to play with door handles while they are riding, and accidents have resulted when a child has inadvertently caused an automobile door to open while the automobile is in motion. As a precaution against this happening, some parents remove the automobile handles that would be accessible to a child but this practice is an inconvenient and unsatisfactory solution to the problem.

The safety handle of this invention prevents the possibility of an accident of this nature occurring. This handle, when not in use, is freely rotatable on a latch spindle. In order to open a door with this type handle it is necessary to engage the handle with the latch spindle by actuating locking means operable from within the handle. This locking means is actuated by the simultaneous turning of a ring at the top of the lever portion and a special rotation of the handle. If the ring is released, a spring immediately returns it to its normal position, thereby disengaging the lever from the spindle. The door can only be opened by turning this ring and pivoting the lever in what would be an unnatural motion. The operation of the handle is simple yet it requires a conscious effort. The required action is such that a child could not unlatch the door.

The handle illustrated in the drawing is a preferred form to be used as replacement equipment for any automobile door latch. With only slight modifications the principle could be incorporated into the latch mechanism itself and this would be preferred in an original equipment application.

In the drawing—

Fig. 1 is a fragmentary view of the inside panel of an automobile door with the handle installed thereon;

Fig. 2 is a side view of the handle mounted on the spindle of an automobile door latch;

Fig. 3 is a front view of the same installation;

Fig. 4 is a view of the handle taken on the line 4—4 of Fig. 2;

Fig. 5 is a view of the handle showing the position of the locking mechanism when the handle is disengaged from the spindle;

Fig. 6 is a view of the handle at the beginning of the first pivotal motion which will engage the lever with the spindle;

Fig. 7 is a view of the handle after the locking means has engaged the lever with the latch spindle and the latch-actuating pivotal motion is partially completed; and Figs. 8a to 8f show an exploded view and the individual parts of the handle.

Referring to Figs. 1-4, the handle assembly 1 for an automobile door operates the spindle 2 of door-latch mechanism 3. A circular plate 4 (preferably plastic) concentrically surrounds the spindle 2 and rests against the door panel upholstery 5. The plate 4 is chiefly for decorative purposes but it may serve to retain a pin or spring means which secures the door handle to spindle 2, and it is effective in preventing wear of the upholstery 5 if the installation is such that the handle would rub against the upholstery while being operated.

Fig. 8a illustrates the handle or lever 8 formed with a flat, circular face 9 having an annular flange 10 protruding perpendicularly therefrom. The outer diameter of flange 10 is smaller than the diameter of face 9 and flange 10 is located concentrically with respect to face 9. Bosses 11 and 12 are formed on the exterior surface of flange 10 and are joined to face 9. These bosses 11 and 12 are diametrically opposite each other on flange 10. Two flat springs 13 are arcuately disposed around the exterior of flange 10 with one end of each spring fixed to a boss. At the free end of each spring 13, a pin 14 is secured. When a spring 13 is flexed, the pin 14 is adapted to pass into and out of a hole 15 which is drilled through flange 10. The holes 15 are located in the flange 10 diametrically opposite each other. A plurality of slots 16 are cut through flange 10 near its outer edge. Slots 16 are adapted to receive a spring 17 (Fig. 8f) when all parts of the handle have been assembled. Spring 17 holds the assembly together. The lever portion of the handle, including the flange 10 and bosses 11 and 12, is preferably die cast from any suitable metal.

A cylindrical adapter 19, shown in Fig. 8b, fits into the flange 10 of the lever portion. Holes 20 are drilled diametrically opposite each other through the wall of the adapter 19. The adapter 19 is rotatable in the flange 10 and at some rotative position of it the holes 20 will be in register with the holes 15 through the flange 10.

The portion of face 9 inside flange 10 is preferably recessed into the thick portion at the end of lever 8 to receive the part of the adapter 19 between the holes 20 and end 21. This gives additional support to lever 8 and strengthens the assembly but for purposes of clarity, it has been omitted from the drawings.

A circumferential groove 22 is provided on the outer surface of the adapter 19. This groove 22 receives the portions of the spring 17 (Fig. 8f) which pass through the slots 16 in the flange 10 after the parts have been assembled. The adapter 19 is thereby retained inside the flange 10 by spring 17 but the groove 22 permits free rotation of the adapter and flange with respect to one another.

The cross-sectional shape of the passage 23 through the adapter 19 may be varied to fit around the different types of latch spindles to which the handle may be applied. This passage 23 may be square or it may be of hexagonal shape. In the preferred embodiment the passage 23 is of circular shape and is provided near the end 21 with serrations (not shown) on the inner surface of the adapter 19 which are engageable with similar serrations 24 (Fig. 2) on spindle 2. These serrations engage the adapter with the spindle and prevent relative rotation between them. A groove 25 is provided on a portion of the outer surface of the adapter 19 with slots at each end of the groove passing through the wall of the adapter 19. This groove 25 receives a spring (not shown) which locks the adapter 19 on spindle 2. This standard construction is the preferred means for locking the adapter to the spindle but a pin or the like may also be used.

A housing ring 26 is illustrated in Fig. 8c. Two bosses 27 and 28 protrude from its inner surface. Two flat springs 29 are slidably retained against small stops 29' (Fig. 5) on the inner surface of ring 26. Before the housing ring 26 is assembled with other parts of the handle these springs 29 will be substantially straight. The housing ring 26 with the springs 29 is adapted to be fitted over the flange 10 and surrounds the springs 13. One side of the ring 26 bears on face 9 and makes sliding contact therewith when the ring is turned. In order to make this assembly it is necessary to depress the springs 13 and the springs 29 until they are located properly with respect to the various bosses on the flange 10 and the ring 26. Fig. 5 shows the positions of these springs when the assembly is completed.

After the assembly of the ring 26 and the lever assembly, the wire spring 30 (shown in Fig. 8d) is put in position by inserting the end 31 into hole 32 in boss 12 and the opposite end 33 into hole 34 in boss 27. Fig. 5 shows the position of spring 30 after it is inserted and this is the normal position of the spring when the handle is not in use. Here the spring 30 is under sufficient tension to hold the ring 26 in the position shown in Fig. 5. In this position the bosses 27 and 28 are in contact with the ends of the springs 13 which serve as stops. Therefore the ring 26 can only be turned in one direction from its normal position. When ring 26 is arcuately turned relatively to flange 10 by pressure exerted on thumb rest 35, spring 30 is drawn to the position shown in Figs. 6 and 7. When the thumb pressure is removed, the tension of spring 30 returns the ring 26 to its normal position as shown in Fig. 5.

A retaining ring 36, shown in Fig. 8e fits into an annular recess 37 on a side of ring 26. In the completed assembly the flange 10 will protrude a sufficient distance through the retaining ring 36 to expose the slots 16 in the flange 10. The points 38 on spring 17 (shown in Fig. 8f) fit into the slots 16 on flange 10. Spring 17 bears directly on the retaining ring 36 thereby holding the various parts together.

The operation of the handle will be explained with reference to Figs. 5, 6 and 7. (The spring 17 and the retaining ring 36 are omitted from these views.)

Fig. 5 shows the assembled mechanism and the relative position of each part when the handle is not in use. The adapter 19 is engaged with spindle 2 by means of the serrations 24 which are only shown in Fig. 2 and the spring means which fits into groove 25. At this position the handle is freely rotatable on the adapter 19 but the adapter is immovable relative to the spindle 2. Regardless of how the handle is rotated the latch mechanism cannot be operated.

Fig. 6 is a view of the relative positions of the parts at the beginning of the first operating motion required to actuate the locking means. The lever 8 is gripped and the ring 26 is arcuately turned by exerting thumb pressure on thumb-rest 35. The arcuate movement of the ring 26 is limited by the bosses on the flange 10 and in the ring 26. When the boss 27 is brought into contact with the boss 12 the arcuate movement of the ring 26 will be stopped.

As the ring 26 is turned, the flat springs 29 will be moved out of contact with the bosses 11 and 12 thus relieving some of the tension in them. The springs 29 will tend to straighten and they will come into contact with the free ends of springs 13, flexing the free ends of springs 13 inwardly and forcing the pins 14 through the holes 15 in the flange 10 and pressing them against the adapter 19.

Simultaneously with the arcuate movement of the ring 26, the lever 8 is pivoted in the direction of the arrow in Fig. 6. This causes the flange 10 to rotate on the adapter 19. Due to the action of the ring 26 and the springs 13 and 29, as described in the preceding paragraph, the pins 14 will be pressed against the adapter 19. The flange 10 will rotate on the adapter 19 until the holes 15 in the flange 10 are in register with the holes 20. The spring pressure on the pins 14 will then force the pins into holes 20 of the adapter 19. The handle assembly is then engaged with the spindle 2 of the latch.

After the pins 14 have been engaged in the holes 20 in the manner described above, the lever 8 is pivoted in the opposite direction in order to operate the latch mechanism. (See arrow of Fig. 7.) The torque applied through the lever 8 is transmitted to the spindle 2 through the pins 14 and the adapter 19 thus causing the spindle 2 to be rotated. After sufficient rotation of the spindle 2 the latch is actuated and the door can be opened.

When the thumb pressure on thumb rest 35 is removed, the tension in the spring 30 causes the ring 26 to return to the position shown in Fig. 5. As the ring 26 moves back to this position, the bosses 11 and 12 will be brought into contact with the flat springs 29 which deflects them toward the under wall of the ring. As the pressure exerted by springs 29 on the free ends of springs 13 is removed, springs 13 draw the pins 14 out of holes 20 thereby disengaging the flange 10 from the adapter 19. The handle will then be free to rotate on the adapter 19.

The pivotal movements of lever 8 that are indicated by the arrows in Figs. 6 and 7 are required to operate the latch-mechanism 3 which is illustrated in Fig. 1. If the latch mechanism is of such design that its operation requires the handle to be pulled rather than pushed, the lever 8 can be installed to pivot oppositely to the directions shown. A reverse pivotal movement may be obtained by installing adapter 19 on spindle 2 so that the radial holes 20 therein are positioned at approximately 90° in a clockwise direction from the position in which they are shown in Fig. 5.

The parts of this handle are designed so that they may be assembled for either right or left door operation. In a handle for a right door it is desirable to turn ring 26 in a direction opposite to that of a left door. This may be accomplished by assembling certain of the parts of a handle for a right door in different locations from their positions in a left handle.

For example, the handle shown in the drawing may be reassembled so that it may be gripped with a right hand and the ring 26 turned in a clockwise direction. To permit such a movement the springs 13 are secured to their respective bosses so that they extend around flange 10 above the first and third quadrants of the circumferential area thereof rather than the second and fourth as shown. The ring 26 is then turned over and fitted over springs 13. The edge of ring 26 which was in contact with face 9 of lever 8 in the handle assembly for a left door will face outwardly in an assembly for a right door handle. The spring 30 is installed by inserting the end 33 in hole 32' in boss 11 of flange 10; the opposite end 31 is inserted in hole 34' passing through boss 28. Thus it is apparent that the same parts may be conveniently assembled for either a right or left door.

In an application of this principle to original equipment, the adapter 19 could be eliminated and the latch spindle 2 designed to fit directly into flange 10 and to receive the locking pins 14. Other embodiments of this invention could be had by placing the locking means inside the door panel adjacent the latch mechanism and designing the housing ring 26 and the lever 8 to actuate them from the exterior of the panel. The handle shown is typical of that used by one of the large automobile manufacturers and is selected merely for illustration.

What I claim is:

1. On the inside of an automobile door equipped with latch mechanism for closing and opening the same, a handle which is rotatable with respect to the latch mechanism and which when not in use comes to a rest position, and locking means to engage the handle with the latch mechanism, the latch mechanism being operable by the handle to open the door only when the handle is turned in one direction, which locking means is movable with respect to both the latch mechanism and handle, and means for engaging the locking means with the latch mechanism only when the handle is turned in the opposite direction to a position away from the rest position and is at a particular angle with respect to the position of the handle when in the rest position.

2. A handle assembly for operating latch mechanism in a door or the like, which assembly includes a handle which is rotatable with respect to the latch mechanism, locking means for engaging the handle with the latch mechanism, the handle assembly being designed for unlatching the latch mechanism when the handle is turned in one direction only, and means for engaging the handle with the locking means only when the handle is first turned in the opposite direction.

3. On the inside of an automobile door equipped with latch mechanism for closing and opening the same, a spindle for operating the latch mechanism, a handle rotatable about the axis of the spindle, locking means for engaging the handle with the spindle only when the handle is turned to one particular angle with respect to the spindle, and spring means for maintaining said locking means in disengaged position when the handle is not in use.

4. A handle assembly for rotating a spindle in latch mechanism in a door or the like, which spindle is to be turned only in a particular direction to operate the latch mechanism, which assembly includes a handle rotatable about the spindle, means for engaging the handle with the spindle only when the handle is turned in one direction, a spring for maintaining said means normally out of engagement when the handle is not in use, and locking means for engaging the handle with the spindle, which locking means is thus engageable only when the handle is turned in a direction opposite to the aforesaid particular direction.

5. A handle assembly for operating latch mechanism in a door or the like, which assembly includes a handle for operating the latch mechanism, means for maintaining the handle operatively independent of the latch mechanism when not in use, the latch mechanism being capable of unlocking the door by rotation of the handle in one direction only, means for engaging the handle with the latch mechanism and means rotatable about the axis of the handle to actuate said engaging means when the handle has been moved in a direction opposite to the aforesaid direction.

6. In a latch mechanism having a handle assembly, a handle for operating the latch mechanism, means for maintaining the handle operatively independent of the latch mechanism when not in use, the latch mechanism being capable of unlatching the door by rotation of the handle in one direction, means for engaging the handle with the latch mechanism, means rotatable about the axis of the handle to actuate said engaging means when the handle has been moved in a direction opposite to the aforesaid direction, and spring means for moving said rotatable means when not in use to a position in which engagement of the handle with the latch mechanism is not effected.

7. A handle assembly for rotating a spindle in latch mechanism in a door or the like, which assembly includes means for operating the latch mechanism surrounding the spindle, a handle rotatable with respect to said means, openings in said means and the handle, means for insertion in said openings when in alignment, the handle being rotatable about the rotational axis of the surrounding means, and rotatable with respect to the surrounding means to bring the openings into alignment, and spring means for turning the handle when not in use for bringing the openings out of alignment.

8. A handle assembly for rotating a spindle in latch mechanism in a door or the like, which assembly includes a handle for operating the spindle, means for maintaining the handle operatively independent of the spindle when not in use, the spindle being capable of unlatching the latch mechanism when actuated by rotation of the handle in one direction only, and means for engaging the handle with the spindle when the handle has been moved in a direction opposite to the aforesaid direction.

9. A handle assembly for rotating a spindle in latch mechanism in a door or the like, which assembly includes a handle rotatable about the axis of the spindle, spring means for maintaining the handle normally disengaged from the spindle when the handle is not in use, a pin adapted to be moved generally radially of the spindle, an opening in the surface of the spindle and in the handle to receive the pin, means for moving the pin to radially different positions about the spindle to bring it into and out of position to be received by said openings, the handle being designed to be turned in one direction only to actuate the latch mechanism, and said openings for reception of the pin being adapted to be brought into alignment only when the handle is turned with respect to the spindle in the direction opposite to the aforesaid direction.

10. A handle assembly for rotating a spindle in latch mechanism in a door or the like, which assembly includes a handle rotatable about the spindle, means to maintain the handle in one position when not in use, a pin adapted to be moved substantially radially of the spindle, an opening in the spindle and the handle to receive the pin, the handle being designed to be turned in one direction only from the aforesaid position to actuate the latch mechanism, said openings for reception of the pin being brought into alignment only when the handle is turned with respect to the spindle in the direction opposite to the aforesaid direction, and means for moving said pin into the openings when brought into alignment and for removing the pin from the openings.

11. A handle assembly for rotating a spindle in latch mechanism in a door or the like, which assembly includes a handle rotatable about the axis of the spindle, means to maintain the handle in one position when not in use, a pin adapted to be moved radially of the spindle, an opening in the surface of the spindle and in the handle to receive the pin, and means rotatable about the spindle for moving the pin into position to be received by the openings when in alignment and spring means for moving it out of said position when the handle is not in use, the handle being designed to be turned in only one direction from the first-mentioned position to actuate the latch mechanism, and said openings for reception of the pin being brought into alignment only when the handle is turned with respect to the spindle in the direction opposite to the first-mentioned direction.

12. A handle assembly for rotating a spindle in latch mechanism in a door or the like, which assembly includes a lever freely rotatable about the spindle and with its center of gravity located so that it swings to the upright position when not in use, the assembly being designed for movement of the lever in one direction from said upright position for unlatching the door, means for connecting the lever with the spindle, actuating means rotatable independently of the lever but rotatable with the lever in the direction opposite to said direction to actuate said connecting means so that that when the lever is thereafter turned in the first-mentioned direction the door is unlatched, and spring means connecting the lever and actuating means for moving the latter out of connecting position when the handle assembly is not in use.

13. A handle assembly for operating latch mechanism in a door or the like, which assembly includes a handle rotatable with respect to the latch mechanism, locking means for engaging the handle with the latch mechanism, and adjacent the handle, means rotatable therewith and independently rotatable to actuate said locking means.

14. A handle assembly for operating latch mechanism in a door or the like, which assembly includes a handle which is rotatable with respect to the latch mechanism, and locking means for engaging the handle with the latch mechanism, which locking means includes means which is rotatable with respect to the latch mechanism independently of the handle.

15. A handle assembly for rotating a spindle in latch mechanism in a door or the like, which assembly includes a handle rotatable about the spindle, and locking means for engaging the handle with the spindle, which locking means includes means actuatable only by rotation of the handle and other means which is rotatable with respect to the latch mechanism independently of the handle.

16. A handle assembly for rotating a spindle in latch mechanism in a door or the like, which assembly includes a handle rotatable about the axis of the spindle, locking means for engaging the handle with the spindle, which locking means is located within the handle, and spring means rotatable with the handle for actuating the locking means to disengage the handle from the spindle.

17. A handle assembly for operating latch mechanism in a door or the like, which assembly includes a handle rotatable with respect to the latch mechanism, means rotatable about the handle and having a normal rest position, a first spring and engaging means adapted to be moved thereby to engage the handle with means for unlatching the door when the rotatable means is rotated about the handle and the handle is moved to a certain position away from its rest position, a second spring adapted to return the means rotatable about the handle to its said rest position whereby the pressure of the first spring on the engaging means is relieved and the engaging means is moved by a third spring and the handle is thereby disengaged from the latch mechanism.

18. A handle assembly for operating a spindle, which assembly includes a rotatable handle, locking means adapted to rigidly engage the handle with said spindle, means rotatable about the axis of the handle adapted to effect said engagement of the locking means when the handle has been rotated relative to the spindle, and spring means for moving said rotatable means to a position in which engagement of the locking means is not effected.

19. A handle assembly for operating a spindle, which assembly includes a handle adapted to be rotated about the spindle and to be turned in one direction to operate the spindle, means to engage the handle with the spindle, actuating means rotatable independently of the handle but rotatable with the handle in the direction opposite to said direction to actuate said engaging means so that when the handle is thereafter turned in the first-mentioned direction the spindle is operated, and spring means connecting the handle and the actuating means for moving the latter out of actuating position when the handle assembly is not in use.

20. A handle assembly for operating a spindle, which assembly comprises an adapter adapted to be rigidly fastened to the spindle, a handle rotatable relative to the adapter, a pin adapted to be moved substantially radially of the adapter, an opening in the adapter and handle to receive the pin, a spring adapted to hold the pin out of the openings when in alignment, the handle being designed to be turned around the adapter to align said openings for reception of the pin, and means actuated by movement of the handle for overcoming the pressure of said spring which is adapted to hold the pin out of the openings, and means for moving said pin into the openings when brought into alignment against the action of the spring.

21. A handle assembly for operating a spindle assembly, which handle assembly includes a rotatable handle, a projection on the handle adapted to fit over the spindle assembly, a hole in the projection which is capable of being brought into alignment with a hole in the spindle assembly by rotation of the handle with respect to the spindle assembly, means on a spring fastened to the handle assembly, which means is located outside the hole in the projection and by movement of the spring is adapted to enter the hole in the projection and the hole in the spindle assembly, means rotatable about the spring and the projection which includes means for pressing the pin into the aforesaid holes when brought into alignment, and spring means connecting said rotatable means and the projection which normally holds the rotatable means in such a position that it does not press the pin into the openings.

References Cited in the file of this patent

UNITED STATES PATENTS

| Number | Name | Date |
|---|---|---|
| 1,257,031 | Schumacher | Feb. 19, 1918 |
| 1,471,553 | Fell | Oct. 23, 1923 |
| 1,601,824 | Goldsmith | Oct. 5, 1926 |
| 1,828,468 | Keller et al. | Oct. 20, 1931 |
| 2,046,342 | Muck et al. | July 7, 1936 |
| 2,333,861 | Harden | Nov. 9, 1943 |